Patented Dec. 17, 1946

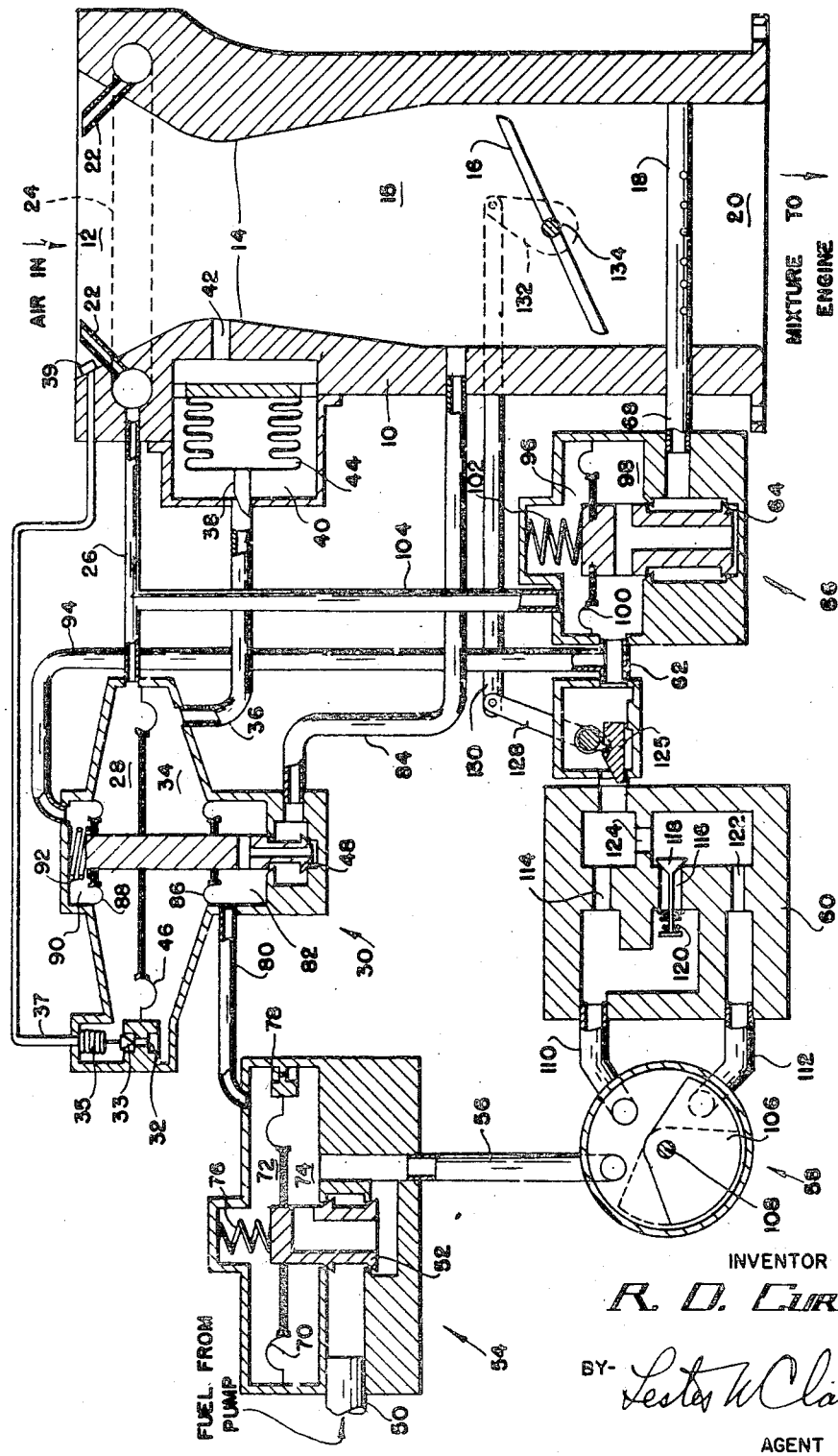

2,412,563

UNITED STATES PATENT OFFICE 2,412,563

CARBURETOR

Ralph D. Curk, Dayton, Ohio, assignor to Chandler-Evans Corporation, South Meriden, Conn., a corporation of Delaware Application July 20, 1944, Serial No. 545,807

1 Claim. (Cl. 261—39)

The present invention relates to the measurement of flow of a fluid of variable density, and particularly to apparatus for measuring the flow of air for use on a carburetor for an aircraft type internal combustion engine.

A carburetor may be defined as a device for controlling the fuel-to-air ratio of the charge supplied to the cylinders of an internal combustion engine. In order to control the proportions of the charge, certain types of carburetors now in common use on aircraft utilize means for measuring the air flow, means for measuring the fuel flow, and means for comparing the air and fuel flows and for controlling the fuel flow so as to correct it if it is not in the proper proportion with respect to the air flow.

Since aircraft must operate at different altitudes and at widely varying temperatures, the pressure and temperature, and hence the density, of the air entering the engine varies widely. In order to maintain a given fuel-to-air ratio, the mass of fuel must be proportioned to the mass of air entering the engine. Therefore, the device which measures the air flow must measure the mass of air flowing per unit time rather than the velocity of the flowing air.

The most common device used to measure the air flow is the Venturi meter. In accordance with the laws of fluid flow, a Venturi meter produces a pressure differential which varies as a function of the velocity of the fluid flowing thru it. If the device is to measure the mass of the flowing air, the pressure differential produced by the Venturi meter must be corrected for variations in air density.

A correction for air density has been obtained in the past by utilizing a sealed bellows filled with a temperature responsive fluid to operate a valve controlling the flow of air thru a passage wherein the air flow is induced by the pressure differential set up by the Venturi meter. Such a valve provides only an approximate correction for air density, since the correction produced for a given change in temperature is different for each value of pressure. Likewise, the correction produced for a given change in pressure is different for each temperature encountered.

It is, therefore, an object of the present invention to provide improved means for measuring the rate of flow of a mass of fluid of variable density.

Another object of the invention is to provide means, in connection with a Venturi meter used with a fluid of variable density, to correct the meter for variations in the temperature of the flowing fluid independently of any variations in its pressure, and means for correcting the Venturi meter for pressure variations independently of any temperature variations.

A further object of the invention is to provide improved means of the class described adapted for use in connection with a carburetor for an aircraft type internal combustion engine.

Other objects and advantages of the invention will become apparent from a consideration of the appended specification, claim and drawing, in which the single figure represents, somewhat diagrammatically, a carburetor for an internal combustion engine employing the principles of my invention.

Referring to the drawing, there is shown a body 10 of a carburetor for an internal combustion engine of an aircraft. Air enters the carburetor body 10 at an inlet 12 and flows thru a Venturi restriction 14 and a passage 15, past a throttle 16 and a fuel discharge nozzle 18 to an outlet 20. A supercharger may be provided between the outlet 20 and the intake manifold of the engine. In certain cases the supercharger may be upstream from the inlet 12, or two superchargers may be used, one in each place.

The Venturi restriction 14 produces a pressure differential between the inlet 12 and the throat of the restriction which varies substantially in accordance with the square of the velocity of the air passing thru the restriction. Since the cross-sectional area of the Venturi is constant, this pressure differential may be taken as a measure of the volume of air flowing thru the passage per unit time.

In order to obtain a pressure differential varying as a function of the mass of air per unit time flowing thru the Venturi 14, the pressure differential between entrance 12 and the throat of Venturi 14 is utilized to create an air flow thru a secondary air passage extending from entrance 12 to the throat of Venturi 14. A plurality of impact tubes 22 are provided, whose open ends project into the entrance 12 to receive the impact of the entering air. The secondary air passage may be traced from entrance 12, thru tubes 22, a passage 24 interconnecting the impact tubes, a conduit 26, a chamber 28 in a pressure meter generally indicated at 30, a restriction 32, a chamber 34 in the pressure meter 30, a conduit 36, past a valve 38 into a chamber 40, and thence thru a conduit 42 to the throat of Venturi 14.

The valve 38 is operated by a sealed bellows 44 mounted in the chamber 40. The bellows 44 is fixed at one end, so that the position of the free end, to which valve 38 is attached, varies in accordance with the air pressure in the chamber 40. The bellows 44 is preferably filled with nitrogen or some other suitable temperature responsive fluid, so that the position of valve 38 varies not only with the pressure but with the temperature of the air in the chamber 40, and hence with the density of that air.

The cross-sectional area of restriction 32 is controlled by a valve 33 operated by a bellows 35. The bellows 35 is filled with any suitable temperature responsive fluid and is connected thru a tube 37 of suitable dimensions to a bulb 39 inside the air passage in the carburetor body 10. The bulb 39 is filled with the same fluid and operates to cause an expansion of the bellows 35 and a closing movement of valve 33 upon an increase in temperature adjacent the bulb 39. The tube 37 should be made as short and as small as possible in order that the valve 33 may respond correctly to the temperature of the combustion air, without regard to the ambient temperature, which may be affected by heat from the engine. Although the tube 37 is shown as being quite long and of substantial diameter in the drawing, it was so drawn merely for purposes of facilitating the illustration.

In the secondary air passage, the pressure differential between the entrance 12 and the throat of venturi 14 is divided into two component pressure drops, one across the restriction 32 and the other across the valve 38. The valve 38 is positioned in accordance with the pressure of the air flowing thru the passage 15. Valve 38 is moved toward open position as the air pressure increases and toward closed position as the air pressure decreases. If the volume of air flowing per unit time thru passage 15 remains constant while its pressure decreases, then the mass of air is decreased, but the pressure differential set up by the venturi 14 remains constant. However, the movement of valve 38 toward closed position causes the component pressure drop across valve 38 to increase, and the component pressure drop across restriction 32 to decrease proportionately, reflecting the decrease in the mass of air flowing per unit time.

The bellows 44 responds to changes in temperature of the air in chamber 40 in a similar manner. An increase in temperature of that air causes an expansion of bellows 44 and so reduces the pressure drop across restriction 32 to compensate for the decrease in density of the air accompanying its increase in temperature.

Since the volume of bellows 44 is different for each value of external pressure, it may be seen that the bellows produces a different travel of valve 38 per unit change in temperature for each different value of pressure. At sea level, the air pressure is relatively high, the bellows 44 has a small volume and, therefore, produces a relatively small travel per degree change of temperature. At high altitudes, and consequent low atmospheric pressures, the bellows 44 has a relatively large volume and hence produces a larger travel per degree change in temperature. Under those circumstances, its effect is to overcompensate for changes in temperature. In other words, instead of correcting the inherent tendency of the carburetor to produce too rich a mixture as the air density increases due to increase in temperature, the valve 38 under those circumstances over-corrects and causes the carburetor to produce too lean a mixture.

The valve 33 opposes this tendency by closing in response to increasing temperatures so as to increase the pressure drop across restriction 32 as the temperature increases.

The particular contour selected for valve 38 is a compromise design of a rather complicated nature, which depends on the characteristics of the bellows, and on the particular limitations of pressure and temperature at which the carburetor is designed to operate on a particular type of aircraft. The contour of valve 33 must also be a compromise design. It has been found, however, that it is possible to approach more closely the ideal of theoretical perfect density compensation at all values of temperature and pressure by the use of the two valves 33 and 38, than is possible by the use of the valve 38 alone.

Although I have illustrated the bellows 44 as being responsive to both pressure and temperature, the temperature responsive feature may be eliminated from that bellows, if desired, by using an evacuated bellows. The temperature correction would then be obtained only from bellows 35 and valve 33. Under such circumstances, the contours of both valves would have to be differently designed. Furthermore, it would be desirable to have the valve 33 work in the opposite direction. That is, the valve 33 should open as the temperature increases instead of closing with increasing temperature as now shown.

By proper design of valves 38 and 33, the pressure drop across restriction 32 may be made to vary substantially in accordance with the mass of air flowing thru passage 15. This pressure differential across restriction 32 acts on the diaphragm 46 which separates the chambers 28 and 34. The force applied to diaphragm 46 is transmitted to a valve 48, on which it acts in a closing direction.

The fuel enters the carburetor from a fuel pump or other source of fuel under superatmospheric pressure. It flows thru a conduit 50, a valve 52 in a pressure regulator generally indicated at 54, a conduit 56, a mixture control generally indicated at 58, a jet system 60, an idle valve 125, a conduit 62, a valve 64 in a second regulator 66, and a conduit 68 to the fuel discharge nozzle 18.

The pressure regulator 54 includes a diaphragm 70 separating a pair of expansible chambers 72 and 74 and connected at its center to the valve 52. A spring 76 biases the valve 52 toward open position. A restriction 78 connects the chambers 72 and 74.

A portion of the fuel entering pressure regulator 54 flows thru chamber 74, restriction 78, chamber 72, a conduit 80, a chamber 82 in the pressure meter 30, past the valve 48, and thru a conduit 84 to the main air passage 15.

The pressure meter 30 includes a diaphragm 86 separating the chambers 34 and 82 and a diaphragm 88 separating the chamber 28 from a fourth expansible chamber 90. The valve 48 is biased toward closed position by a spring 92.

The chamber 90 is connected thru a conduit 94 to the fuel conduit 62 downstream from the jet system 60. The pressure in chamber 90 is therefore the same as that in the fuel line downstream from the jet system. The pressure in chamber 82 is the same as that in chamber 72 of pressure regulator 54. The position of diaphragm 70 and valve 52 is determined by the balance between the spring 76 plus the pressure in chamber 72 acting in a valve opening direction and the pressure in chamber 74 acting in a valve closing direction. If the balance between these forces is upset, the diaphragm 70 and valve 52 move until the balance is restored. Therefore the pressure in chamber 72 is a measure of the pressure in chamber 74, which is substantially the same as the pressure on the upstream side of the jet system 60. For any given constant cross-sectional area of the fuel passages thru the jet system 60, the pressure differential across it is a measure of the fuel flow thru it. This pressure differential, or rather a smaller pressure differential which is a measure of the pressure differential across the jet system, is applied thru the diaphragms 86 and 88 of pressure meter 30 to the valve 48, on which it acts in an opening direction.

From the foregoing, it may be seen that the valve 48 is positioned in accordance with the balance between two forces, one of which varies in accordance with the mass of air entering the carburetor, and the other in accordance with the mass of fuel entering the carburetor. Furthermore, the valve 48 controls the mass of fuel entering the carburetor, since it controls the pressure in chamber 82. The pressure in the chamber 82 is transmitted to chamber 72 of pressure regulator 54 where it controls the position of valve 52 and hence the pressure on the upstream side of the jet system 60.

The pressure regulator 66 operates to maintain a substantially constant pressure on the downstream side of the jet system 60 and thereby to prevent variations in pressure at the fuel discharge nozzle 18, which may be due to operation of the throttle or to variations in engine speed, from reaching the downstream side of the jet system and affecting the fuel flow.

The pressure regulator 66 includes a pair of expansible chambers 96 and 98 separated by a flexible diaphragm 100, which is attached at its center to the valve 64. A spring 102 biases the valve 64 toward closed position. The chamber 96 is connected thru a conduit 104 to the conduit 26 and thence thru the passage 24 and impact tubes 22 to the air entrance 12. The chamber 98 is connected to the conduit 62.

The mixture control 58 includes a disc valve 106 fixed on a shaft 108. The disc valve 106 controls the flow of fuel thru ports opening into conduits 110 and 112 which lead into the jet system 60. When the disc 108 is in the position illustrated in full lines in the drawing, fuel can flow to the jet system only thru the conduit 110. This full line position of the disc valve 106 is known as the "lean" position of the mixture control 58. When the disc valve 106 is in the dotted line position shown in the drawing, the fuel can flow thru both the conduits 110 and 112. The dotted line position of the disc valve 106 is termed the "rich" position of the mixture control. The disc valve 106 can also be moved to a "cut-off" position wherein it cuts off the flow thru both conduits 110 and 112.

The conduit 110 conducts fuel either thru a fixed restriction or jet 114, or thru a restriction 116 controlled by a valve 118 biased to closed position by a spring 120. The conduit 112 conducts fuel to a fixed restriction 122. Fuel flowing thru the restrictions 116 and 122 also flows thru another restriction 124 which limits the total flow thru restrictions 116 and 122.

The valve 118 is normally closed, but opens at high pressure differentials across the jet system to increase the fuel-to-air ratio under heavy load conditions.

At low air flows, such as are encountered under idling conditions, the pressure differential set up by the venturi 14 tends to be erratic, and is not a reliable indication of the volume of air entering the engine. Provision is made to control the fuel flow directly in accordance with the throttle position at such times. The spring 92 in the pressure meter 30 acts on valve 48 in a closing direction. When the differential pressure acting on diaphragm 46 is small, as under low air flow conditions, the spring 92 becomes the predominating force acting on valve 48. A closing movement of valve 48 causes an increase in the fuel flow thru the main fuel line, since the closure of valve 48 increases the pressure in chamber 82 of pressure meter 30 and hence in chamber 72 of pressure regulator 54. Furthermore, the spring 76 of pressure regulator 54 biases valve 52 in an opening or fuel flow increasing direction.

The idle valve 125 is pivotally attached to a lever 128, whose opposite end is connected by a link 130 to an arm 132 fixed on the shaft 134 of throttle 16. The idle valve is normally wide open when the throttle is beyond a range of positions near its closed position, usually termed the idling range. As the throttle moves into the idling range, thereby decreasing the air flow, the idle valve 125 moves toward closed position. At the same time, the springs 92 and 76 cause operation of valve 52 in an opening direction. The valve 52 is thereby opened sufficiently so that its restrictive effect on the fuel flow is less than that of the idle valve 125. Therefore, the fuel flow under idling conditions is controlled primarily by the valve 125 in accordance with the position of the throttle, and not by the pressure meter 30 in accordance with the mass of air entering the engine.

Although I have illustrated a particular type of carburetor, it will be appreciated by those skilled in the art that my invention may be applied with equal facility to other types of carburetors. The carburetor illustrated may, for example, be modified by omitting the pressure regulator 54 and placing the valve 48 of the pressure meter 30 directly in the fuel line between the pump and the mixture control 58.

While I have shown and described a preferred embodiment of my invention, other modifications thereof will readily occur to those skilled in the art, and I therefore intend my invention to be limited only by the appended claim.

I claim as my invention:

A carburetor for an internal combustion engine, comprising a conduit for combustion air flowing to said engine, means associated with said air conduit for producing two unequal pressures whose difference varies in accordance with the velocity of the air flowing therethru, a passage connecting spaced points in said air conduit subject to said two unequal pressures so that a flow of air is induced thru said passage by said difference of pressures, first and second valves in series in said passage for controlling the flow of air therethru, a first sealed flexible bellows filled with a fluid having an appreciable coefficient of thermal expansion and exposed to the air flowing thru said passage so that it expands upon a decrease in pressure or an increase in temperature of said air, a connection between said first bellows and said first valve so that expansion of said first bellows moves said first valve in a closing direction, whereby an increase in air temperature causes an increase in the pressure drop across said first valve and a corresponding decrease in the pressure drop across said second valve, said first bellows having an inherent tendency to overcompensate for temperature changes under low pressure conditions, a second sealed flexible bellows, a bulb in said air conduit filled with a fluid having an appreciable coefficient of thermal expansion, a pressure-transmitting connection between said bulb and said second bellows, so that an increase in the air temperature adjacent said bulb expands said second bellows, a connection between said second bellows and said second valve so that expansion of said second bellows closes said second valve, whereby an increase in air temperature causes an increase in the pressure drop across said second valve to correct for the overcompensation produced by said first valve, said first and second valves cooperating with said pressure producing means to regulate the pressure drop across said second valve substantially in accordance with the mass of air flowing thru said conduit per unit time, and means responsive to the pressure drop across said second valve for controlling the flow of fuel to the engine.

RALPH D. CURK.